(12) United States Patent
Oleszczuk

(10) Patent No.: US 7,729,248 B2
(45) Date of Patent: Jun. 1, 2010

(54) SCHEDULER HAVING QUEUE FOR SCHEDULING TRANSMISSION OF ITEMS FROM A STATION IN A WIRELESS NETWORK

(75) Inventor: Antoni Oleszczuk, Calgary (CA)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 11/689,081

(22) Filed: Mar. 21, 2007

(65) Prior Publication Data

US 2008/0112317 A1 May 15, 2008

Related U.S. Application Data

(60) Provisional application No. 60/865,452, filed on Nov. 13, 2006, provisional application No. 60/865,454, filed on Nov. 13, 2006.

(51) Int. Cl.
*H04L 12/28* (2006.01)
*H04L 12/66* (2006.01)

(52) U.S. Cl. .................. 370/230; 370/412; 370/463

(58) Field of Classification Search ......... 370/229–232, 370/252, 253, 389, 400, 401, 413, 415, 417, 370/310, 328, 329, 412, 431, 438, 439, 462, 370/463; 455/450–452.2
See application file for complete search history.

(56) References Cited

U.S. PATENT DOCUMENTS

| | | | | |
|---|---|---|---|---|
| 5,844,906 | A * | 12/1998 | Khelghatti et al. | 370/474 |
| 2003/0133457 | A1* | 7/2003 | Ono et al. | 370/395.4 |
| 2004/0082364 | A1* | 4/2004 | Kitazawa et al. | 455/560 |
| 2004/0114562 | A1* | 6/2004 | Kim | 370/338 |
| 2004/0257996 | A1* | 12/2004 | Choi et al. | 370/235 |
| 2007/0058544 | A1* | 3/2007 | Kim et al. | 370/230 |
| 2009/0007199 | A1* | 1/2009 | La Joie | 725/95 |

* cited by examiner

*Primary Examiner*—Aung S Moe
*Assistant Examiner*—Kerri M. Rose

(57) ABSTRACT

A scheduler scheduling items to be transmitted by a subscriber station in a wireless network in accordance with bandwidth assigned to the items by a base station in the network. The items to be transmitted by the subscriber station are placed in a queue. The queue has a first section into which items for which a request for bandwidth assignment has been made to the base station are placed, and a second section into which items for which a request for bandwidth assignment has not yet been made to the base station are placed. The scheduler schedules the items in the queue for transmission by the subscriber station in accordance with which section of the queue the items reside.

17 Claims, 8 Drawing Sheets

SCHEDULER HAVING QUEUE FOR SCHEDULING TRANSMISSION OF ITEMS FROM A STATION IN A WIRELESS NETWORK

CROSS-REFERENCE TO RELATED APPLICATIONS

This application is based on, and claims the benefit of, U.S. Provisional Application No. 60/865,452, filed Nov. 13, 2006, inventor Antoni Oleszczuk, and which is incorporated herein by reference.

This application also is based on, and claims the benefit of, U.S. Provisional Application 60/865,454, filed Nov. 13, 2006, inventor Antoni Oleszczuk, and which is incorporated herein by reference.

BACKGROUND

Description of the Related Art

Wireless networks have become increasingly popular for communications and generally include a number of stations communicating within a certain area. In some types of wireless networks, items to be transmitted from one station to another station are scheduled for transmission by a scheduler. This scheduling of items for transmission requires an assignment of bandwidth for the transmission.

For example, in a wireless network based on an Institute of Electrical and Electronics Engineers (IEEE) 802.16 standard, often referred to as a "WiMAX" network, subscriber stations (SS) communicate with each other and with a base station (BS). A subscriber station can be, for example, a mobile station (MS) or a relay station (RS). When a subscriber station (SS) transmits an item to another subscriber station (SS) or to the base station (BS), the transmitting subscriber station (SS) must first obtain a bandwidth assignment from the base station (BS) for the transmission to do this, the subscriber station must make a request for bandwidth to the base station (BS). In response to the request, the base station (BS) will make a bandwidth assignment (which can also be referred to as a bandwidth allocation). A scheduler of the subscriber station (SS) must then properly process the item for transmission in accordance with the bandwidth assignment by the base station (BS).

Accordingly, a scheduler for scheduling items for transmission by a subscriber station (SS) is well-known. Moreover, such scheduling in accordance with a request for bandwidth to base station (BS) by the subscriber station (SS), and a bandwidth assignment by the base station (BS) in response to the request, is well-known.

Moreover, a scheduler of a subscriber station (SS) must often schedule many items for transmission by the subscriber station, in accordance with bandwidth requests and bandwidth assignments for the items. The items for transmission are typically placed in a queue, and taken from the queue for transmission in accordance with the bandwidth requests and bandwidth assignments. As a result, managing items in the queue can become complex and inefficient.

Accordingly, there is a need for an improved queue design, and for improved management of items in the queue, to thereby improve system performance.

SUMMARY OF THE INVENTION

Various embodiments of the present invention provide an apparatus including (a) a scheduler scheduling items to be transmitted by a subscriber station in a wireless network in accordance with bandwidth assigned to the items by a base station in the network, and (b) a queue into which the items to be transmitted by the subscriber station are placed. The queue has a first section into which items for which a request for bandwidth assignment has been made to the base station are placed, and a second section into which items for which a request for bandwidth assignment has not yet been made to the base station are placed. The scheduler schedules the items in the first section of the queue for transmission by the subscriber station before the items in the second section of the queue are scheduled for transmission.

Various embodiments of the present invention provide an apparatus including (a) means for scheduling items to be transmitted by a subscriber station in a wireless network in accordance with bandwidth assigned to the items by a base station in the network, and (b) a queue into which items to be transmitted by the subscriber station are placed. The queue has a first section into which items for which a request for bandwidth assignment has been made to the base station are placed, and a second section into which items for which a request for bandwidth assignment has not yet been made to the base station are placed. The means for scheduling schedules the items in the first section of the queue for transmission by the subscriber station before the items in the second section of the queue are scheduled for transmission.

Various embodiments of the present invention provide an apparatus including (a) a scheduler scheduling items to be transmitted by a subscriber station in a wireless network in accordance with an allocation of bandwidth from the base station, and (b) a queue into which items to be transmitted by the subscriber station are placed. The queue has a first section into which items for a request for the allocation of bandwidth has been made are placed, and a second section into which items for which the allocation of bandwidth has not yet been made are placed, wherein the first section is at the head of the queue.

Various embodiments of the present invention provide a method including (a) placing items into a first section of a queue of a scheduler of a subscriber station in a wireless network for which a request for bandwidth assignment has been made to a base station, (b) placing items into a second section of the queue for which a request for bandwidth assignment has not yet been made to the base station, and (c) scheduling the items in the queue to be transmitted by the subscriber station in accordance with bandwidth assigned to the items by the base station in accordance with requests for bandwidth assignment made to the base station. The items in the first section of the queue are scheduled to be transmitted by the subscriber station before the items in the second section of the queue are scheduled to be transmitted by the subscriber station.

Various embodiments of the present invention provide a method including (a) scheduling items to be processed by a subscriber station in a wireless network in accordance with a service assigned to the items by a base station in the network, (b) grouping items together in a non-requested section of a queue for which assignment of the service by the base station has not yet been requested, and (c) processing any items in a requested section of the queue before processing items in the non-requested section of the queue.

The above embodiments of the present invention are simply examples, and all embodiments of the present invention are not limited to these examples, or to the features included in these examples.

Additional aspects of the invention will be set forth in part in the description which follows, and, in part, will be obvious from the description, or may be learned by practice of the invention.

DESCRIPTION OF THE PREFERRED EMBODIMENTS

Figure 1:
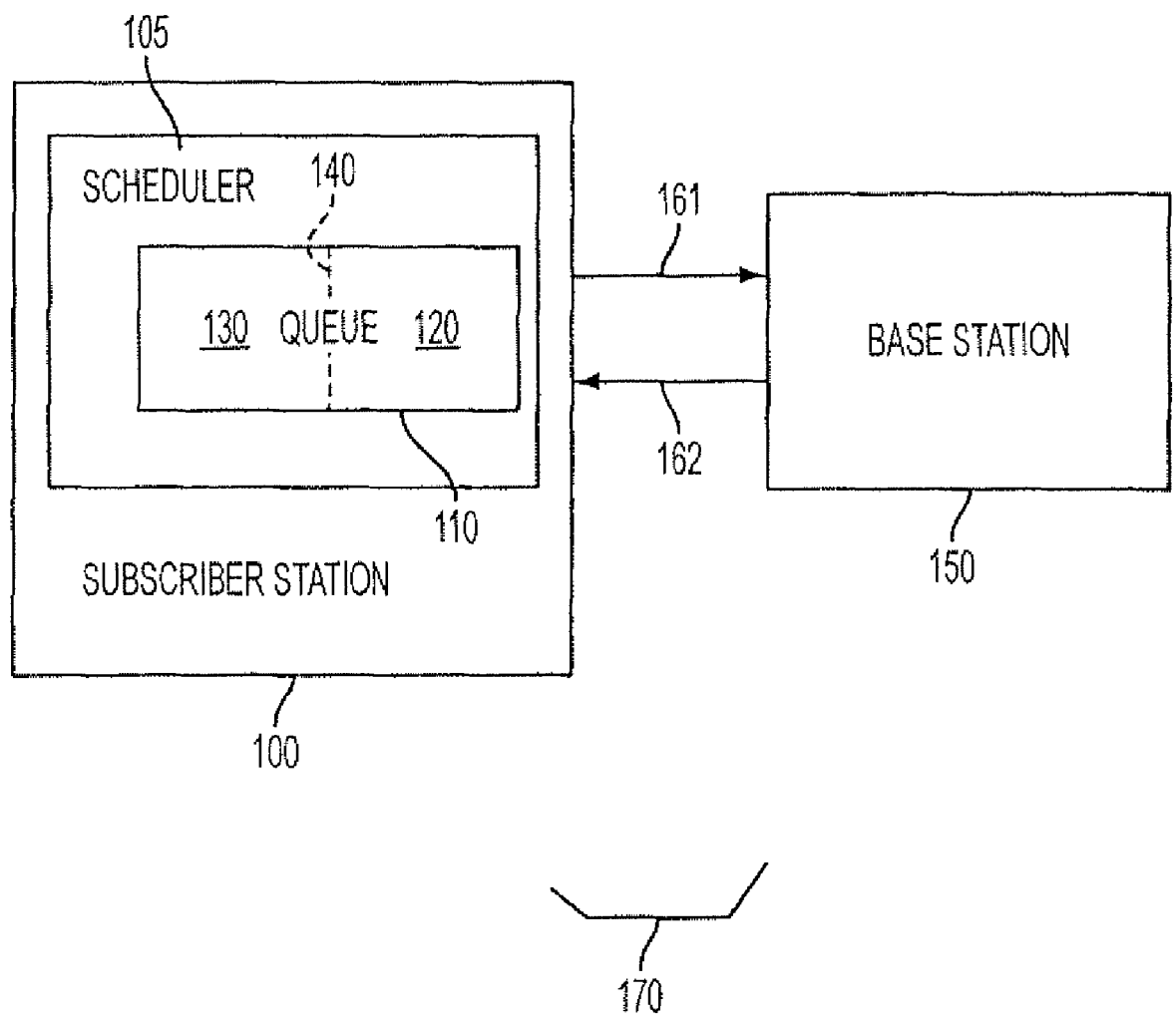
FIG. 1 is a diagram illustrating an apparatus, according to an embodiment of the present invention.

Reference will now be made in detail to embodiments of the present invention, examples of which are illustrated in the accompanying drawings, wherein like reference numerals refer to like elements throughout.

FIG. 1 shows an example of a subscriber station 100 that includes a scheduler 105 in a wireless network. The wireless network could be, for example, an IEEE 802.16 network, which is often referred to as a "WiMAX" network. However, the present invention is not limited to an IEEE 802.16 network. Instead, the present invention is applicable to many other types of networks. Moreover, the present invention is not limited to mobile or fixed networks, or to mobile or fixed stations.

The subscriber station 100 can be, for example, a mobile station (MS) or a relay station (RS). However, a subscriber station is not limited to being any particular type of station. As an example, the subscriber station could be some type of fixed location station. Generally, a subscriber station (SS) can be any type of station that communicates with a base station (BS). The scheduler 105 schedules items to be transmitted by the subscriber station 100 in a wireless network 170. The present invention is not limited to the scheduler 105 being in any particular location.

The scheduling of transmission of items by the subscriber station 100 is made by the scheduler 105 in accordance with an assignment of bandwidth 162 to the items by a base station 150 in the network 170.

As shown in FIG. 1, the scheduler includes a queue 110 into which the items to be transmitted by the subscriber station are placed. As further shown in FIG. 1, according to an embodiment of the present invention, the queue 110 further includes a first section 120 and a second section 130. The items placed in the queue are, for example, data packets supplied by a user layer or management messages supplied by a system layer. For example, if the network is an 802.16 network, the items might be, for example, management messages generated, for example, at a Media Access Controller (MAC) layer of the network. However, the present invention is not limited to the items being any particular type of information or format, or being generated at any particular level in a network. Instead, the items can be anything being transmitted by the subscriber station that requires scheduling by the scheduler 105.

The first section 120 of the queue 110 is the section of the queue 110 into which items for which a request for bandwidth assignment 161 has been made to the base station 150 are placed. The second section 130 of the queue 110 is the section of the queue 110 into which items for which a request for bandwidth assignment has not yet been made to the base station 150. The scheduler 105 schedules the items in the first section 120 of the queue 110 for transmission by the subscriber station before the items in the second section 130 of the queue 110 are scheduled for transmission.

FIG. 1 shows an example division of the queue 110, between the first section 120 and the second section 130, represented by the dotted line 140. This division can be considered dynamic, since, for example, after a request for a bandwidth assignment for an item in the second section of the queue is made to the base station 150, the item in the second section 130 of the queue 110 is dynamically moved to the first section 120 of the queue 110.

Embodiments of the present invention are not limited to scheduling of items for transmission in accordance with a "bandwidth" assignment from the base station 150. Therefore, the assignment of bandwidth can be considered to be an assignment of a service by the base station 150. However, in various embodiments of the present invention, items could be scheduled for transmission in accordance with another service, other than bandwidth assignment, by the base station for the transmission. Therefore, various embodiments described herein as relating to bandwidth being assigned by the base station are also applicable to situations in which a different service, other than bandwidth, is assigned by the base station.

FIG. 1 is only an illustrative example of a subscriber station including a scheduler, a queue, and a single base station operating in a wireless network. For example, the various embodiments of the present invention are not limited to a scheduler having a single queue, and the scheduler can have multiple queues into which the items to be transmitted by the subscriber station are placed. Further, items belonging to a predetermined class of service flows can be automatically placed in a same queue of the multiple queues. Service flows are logical connections and can have defined parameters such as, for example, latency and jitter.

Figure 2:
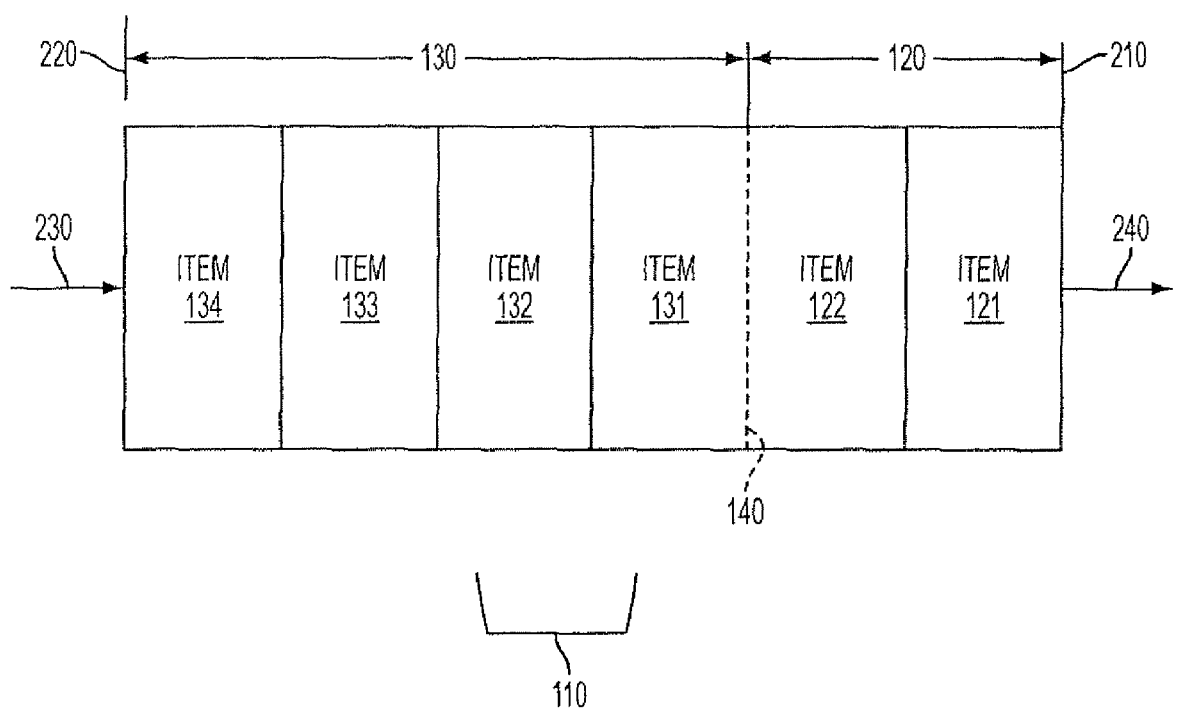
FIG. 2 is a diagram illustrating a queue into which items to be transmitted by a subscriber station are placed, according to an embodiment of the present invention.

FIG. 2 is an illustrative example of the queue 110 divided into sections. As illustrated in FIG. 2, the queue 110 can be divided into a first section 120, which can also be referred to, for example, as a "requested section," and a second section 130, which can also be referred to, for example, as a "non-requested section". Items for which a bandwidth assignment has already been requested, i.e., item 121, item 122, . . . , etc. are placed in the first section 120 of the queue 110. The first section 120 is, for example, nearer a queue head 210. Items for which the bandwidth assignment has not yet been requested, i.e., item 131, item 132, item 133, item 134, . . . , etc. are placed in the second section 130 of the queue 110. The second section 130 is, for example, nearer a queue tail 220. However, the present invention is not limited to the first section 120 being nearer the queue head 210 and the second section being nearer the queue tail 220.

According to an embodiment of the present invention, items in the queue 110 may be considered as having a regular queue order from the queue head 210 to the queue tail 220. That is, items may enter a queue way-in 230 and exit a queue way-out 240 in a regular queue order. A higher priority can be automatically given to items which are in the first section 120 of the queue 110. This is in accordance with the location of these sections in the queue, that is the requested section is ahead of the non-requested section. Further, either of the first section 120 or second section 130 may be empty at a given time.

Such a division, for example, can fulfill an implementation of a subscriber station of a scheduler in a network and can be applicable to the input queues that include items for which bandwidth must be requested including user data queues and management queues, e.g., MAC management queues. According to an embodiment of the present invention, items for which an assignment of bandwidth is not required can be placed in the first section 120 of the queue 110.

FIG. 2 is only an illustrative example of a queue divided into two sections and with a first section having two items and a second section having four items. The various embodiments of the present invention are not so limited and can include any number of items being placed in the sections.

Figure 3:
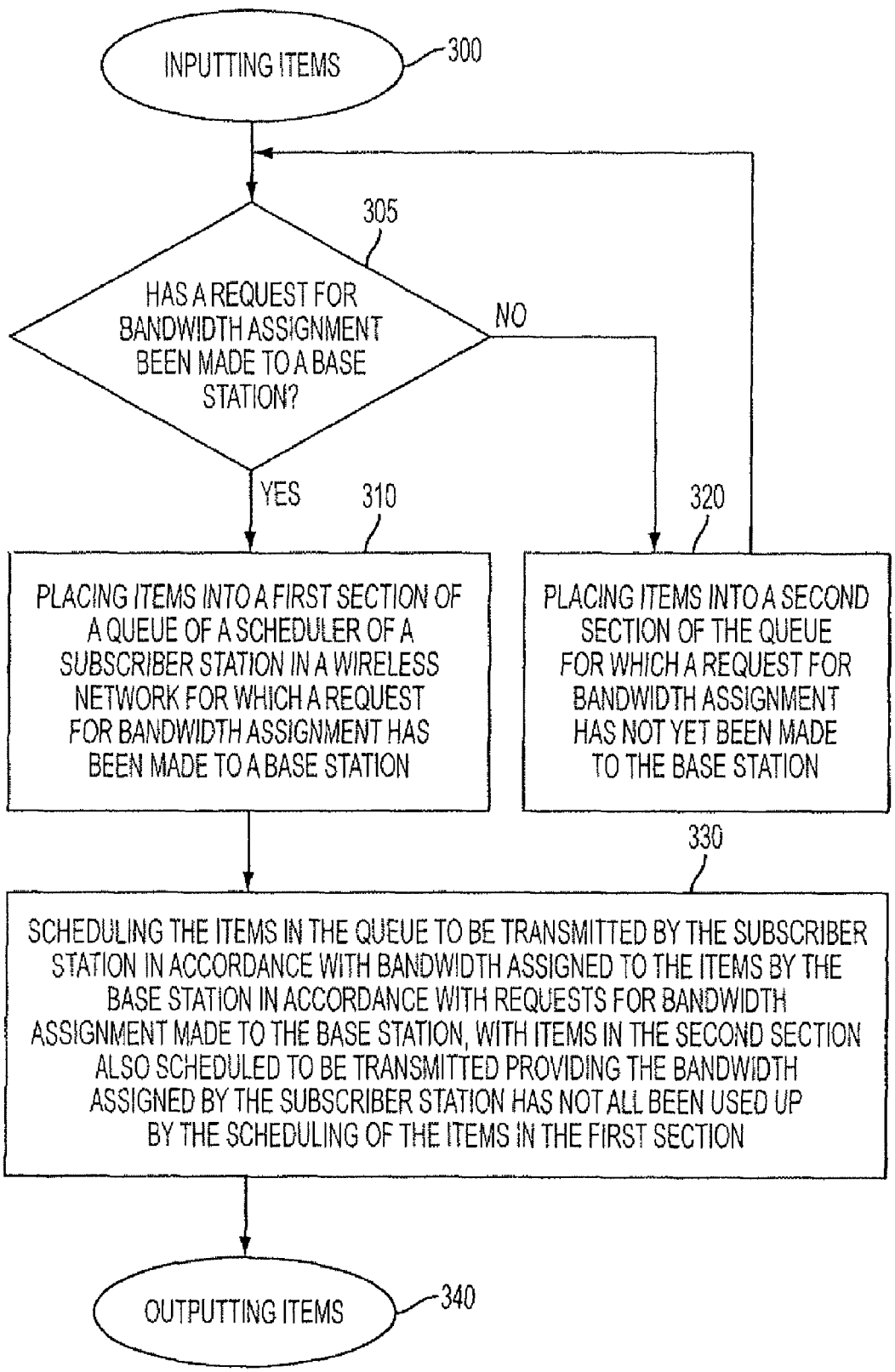
FIG. 3 is a flowchart illustrating a process which includes placing items into a first section of a queue of a scheduler of a subscriber station, according to an embodiment of the present invention.

FIG. 3 illustrates a process, according to an embodiment of the present invention, of placing items into a certain section of a queue of the scheduler. Referring now to FIG. 1, in operation 300, items to be transmitted are input to the scheduler 105. From operation 300, the process moves to operation 305, where a determination is made as to whether a request for bandwidth assignment has been made to a base station.

Upon the request for bandwidth assignment having been made to the base station being determined, from operation 305, the process moves to operation 310, where items are placed into a first section of a queue of a scheduler of a subscriber station in a wireless network for which a request for bandwidth assignment has been made to a base station.

Upon the request for bandwidth assignment having been made to the base station not being determined, from operation 305, the process moves, instead, to operation 320, where items are placed into a second section of the queue for which a request for bandwidth assignment has not yet been made to the base station.

As illustrated in FIG. 3, from operation 310, the process moves to operation 330, where the items in the queue are scheduled to be transmitted by the subscriber station in accordance with bandwidth assigned to the items by the base station in accordance with requests for bandwidth assignment made to the base station.

According to an embodiment of the present invention, the items in the first section of the queue are scheduled to be transmitted by the subscriber station before the items in the second section of the queue are scheduled to be transmitted by the subscriber station. The items in the second section of the queue are also scheduled to be transmitted providing the bandwidth assigned by the subscriber station has not all been used up by the scheduling of the items in the first section of the queue. As illustrated in FIG. 3 from operation 330, the process moves to operation 340, where items are outputted from the queue. The various embodiments of the present invention are not limited, for example, to a placing of items in only one of two sections and can include a placing of items in a further subdivision of sections.

Operations 300, 305, 310, 320 and 330 are performed, for example, by a scheduler such as scheduler 105. Operation 340 is performed, for example, by the subscriber station. However, the present invention is not limited to specific operations in FIG. 3 being performed by the scheduler or the subscriber station.

As an example of operation, a newly arrived item can be placed into the queue in a non-requested section of a scheduler of a subscriber station. The subscriber station can issue a bandwidth request for an input item individually, or can collectively issue a bandwidth request for a multiple of items. Once bandwidth has been requested for an item or items, the respective item, or items, are considered as being moved to the other section of the same queue, i.e., the requested section. When bandwidth is allocated, the subscriber station can determine from other features sent by the base station such as maps, an amount of items to send and can efficiently send out as many items as possible from the head of the queue.

Accordingly, when this sending process occurs, whether the item is actually in the non-requested or requested section of the queue does not effect the efficient processing in that the scheduler can send out as many items as possible from the queue and while preserving the priority order of the items.

Some types of items can be sent without a request for bandwidth assignment, for example, items belonging to Unsolicited Grant Service (UGS) flows. A cellular phone, for example, can use a UGS kind of service in which bandwidth is not requested. Items such as data packets that belong to a class for which no bandwidth requests for these service flow are issued by the subscriber station can be placed immediately into the first section of an input queue.

In some cases, a subscriber station may be given a greater allocation of bandwidth than requested. According to an embodiment of the present invention, the subscriber station can send even those data items for which the subscriber station has not requested bandwidth. Accordingly, an advantage of various embodiments of the present invention is by having the items grouped in sections of a queues, the items can be efficiently processed, i.e., transmitted from the head of the queue.

Figure 4:
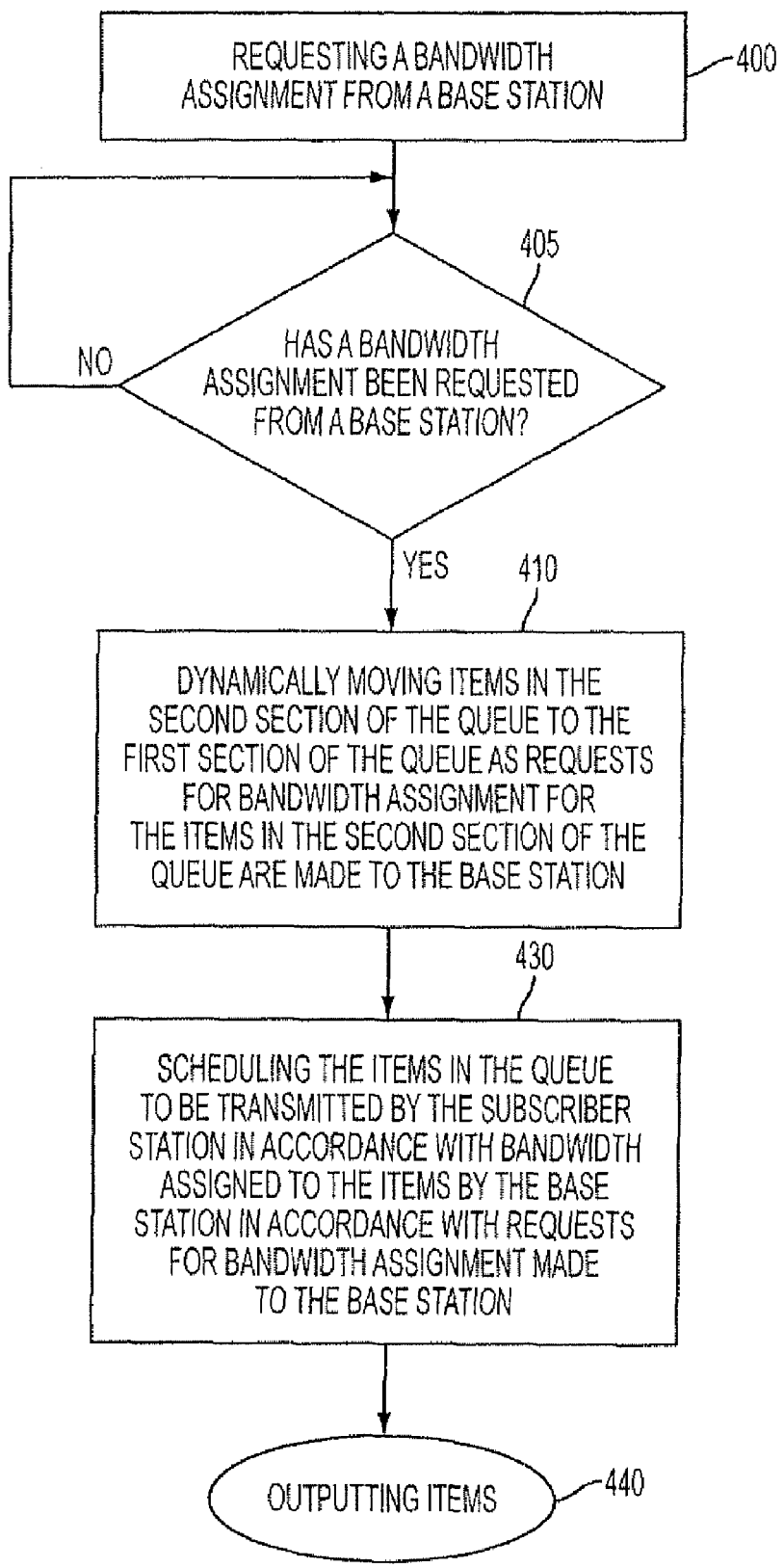
FIG. 4 is a flowchart illustrating a process which includes dynamically moving items in the second section of the queue to the first section of the queue, according to an embodiment of the present invention.

FIG. 4 illustrates a process, according to an embodiment of the present invention, requesting a bandwidth assignment from a base station in operation 400. From operation 400, the process moves to operation 405, where it is determined whether a bandwidth assignment has been requested from a base station.

Upon determining that a bandwidth request has been made to the base station, the process moves to operation 410, where items in the second section of the queue are dynamically moved to the first section of the queue.

From operation 410, the process moves to operation 430, where the items in the queue are scheduled to be transmitted by the subscriber station in accordance with bandwidth assigned to the items by the base station in accordance with requests for bandwidth assignment made to the base station. From operation 430, the process moves to operation 440, where the items are outputted.

The various embodiments of the present invention are not limited to a process only moving items from the second section to the first section but can include other movements of items to subsections within a section. According to an embodiment of the present invention, the first section of the queue, the second section of the queue, or both the first section of the queue and the second section of the queue may be empty at any time.

Operations 405, 410 and 430 are performed, for example, by a scheduler such as scheduler 105. Operations 400 and 440 are performed, for example, by the subscriber station. However, the present invention is not limited to specific operations in FIG. 4 being performed by the scheduler or the subscriber station.

Figure 5:
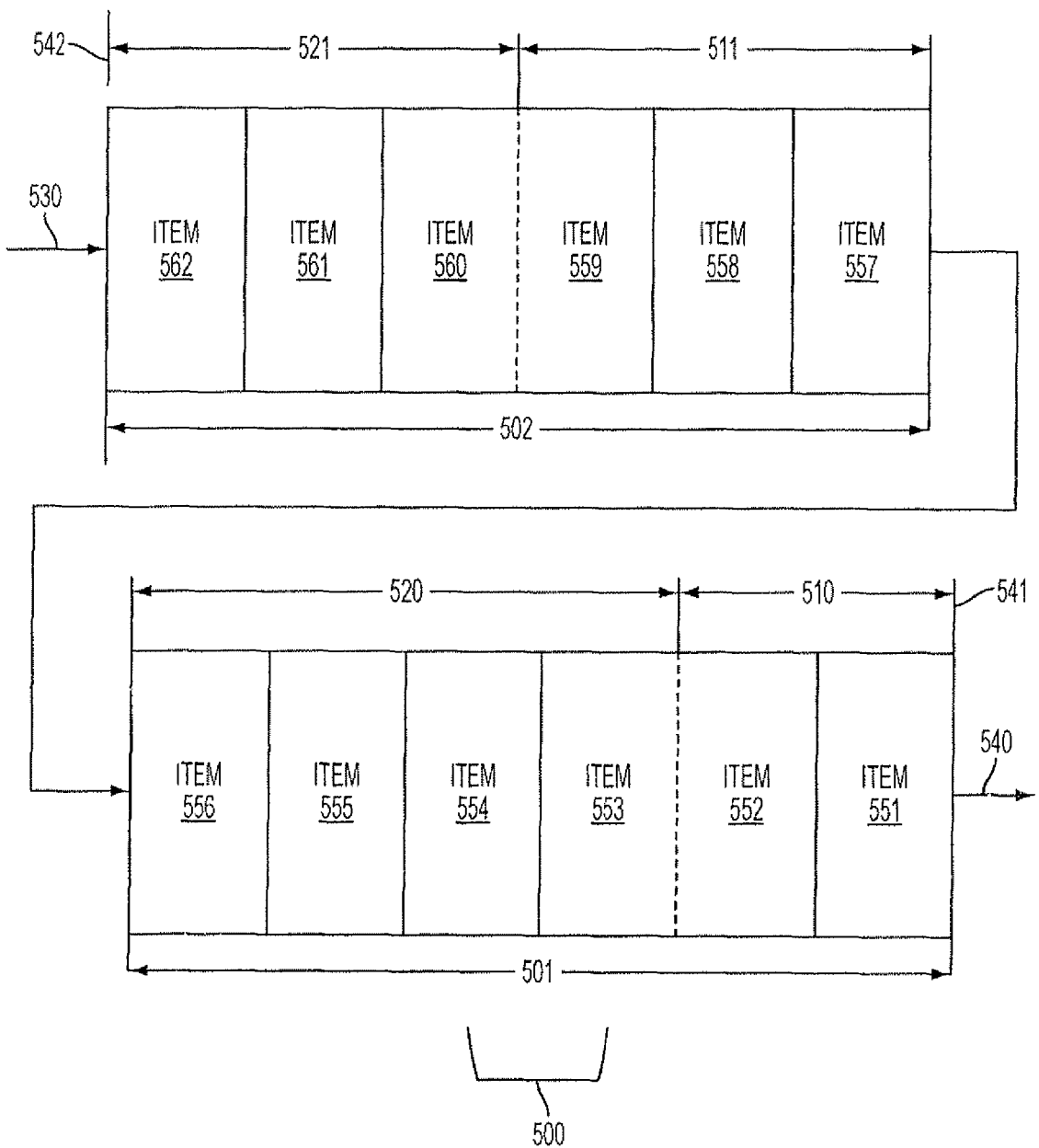
FIG. 5 is a diagram illustrating a jitter queue or a latency queue, according to an embodiment of the present invention.

According to an embodiment of the present invention, the queue can be a jitter queue or a latency queue. FIG. 5 shows such a queue 500 as having a first section 501, i.e., the requested part and a second section 502, i.e., the non-requested part. Further, the first section 501 of the queue has a contention section 510 with items 551 and 552 and a non-contention section 520 with items 553, 554, 555, and 556. Likewise, the second section 502 of the queue has a contention section 511 with items 557, 558, and 559 and a non-contention section 521 with items 560, 561, and 562. According to an embodiment of the present invention, items in the queue 500 may be considered as having a regular queue order with a queue way-in 530 at a queue tail 542 and a queue way-out 540 at a queue head 541. The various embodiments of the present invention are not so limited and can include any number of items in a multiple of sections in a multiple of queues.

Figure 6:
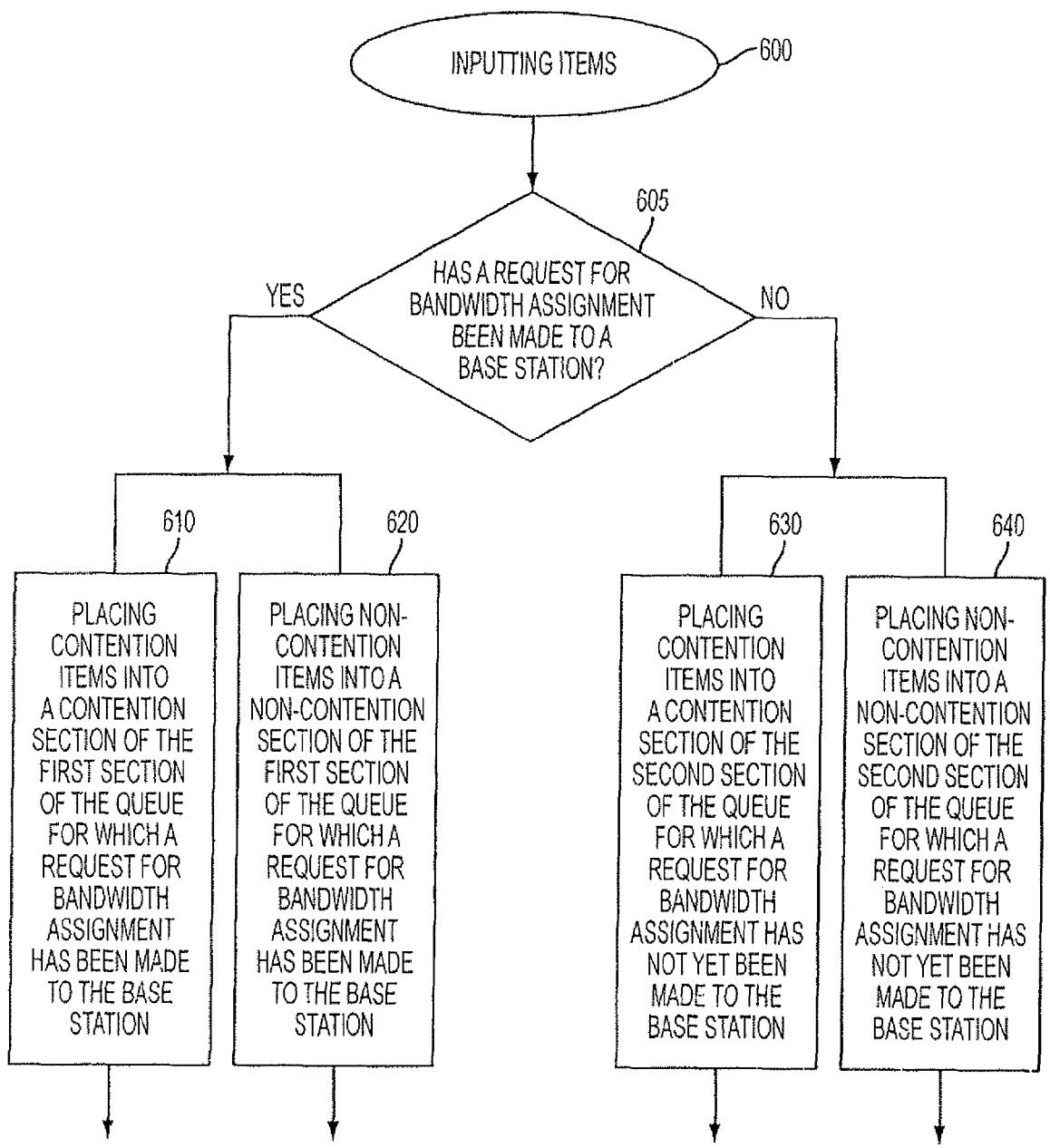
FIG. 6 is a flowchart illustrating a process which includes placing contention items into a contention section of a first section of a queue for which a request for bandwidth assignment has been made to a base station, according to an embodiment of the present invention.

FIG. 6 shows a process according to an embodiment of the present invention in which the queue can be a jitter queue or a latency queue. According to an embodiment of the present invention, some items may be considered in contention with each other for priority and can be referred to as "contention" items. Items not in contention with each other for priority can be referred to as "non-contention" items.

Referring now to FIG. 6, in operation 600 items are input into the queue 500. From operation 600, the process moves to operation 605, where it is determined whether a request for a bandwidth assignment has been made to a base station. Upon the determination that a request for bandwidth assignment has been made to a base station, the process moves to operation 610, where contention items are placed into a contention section 510 of the first section 501 of the queue for which a request for bandwidth assignment has been made to the base station and operation 620, where non-contention items are placed into a non-contention section 520 of the first section 501 of the queue for which a request for bandwidth assignment has been made to the base station.

Upon the determination as a request for bandwidth assignment has not been made to a base station, the process moves to operation 630, where contention items are placed into a contention section 511 of the second section 502 of the queue for which a request for bandwidth assignment has not yet been made to the base station and to operation 640, where non-contention items are placed into a non-contention section 521 of the second section 502 of the queue for which a request for bandwidth assignment has not yet been made to the base station.

In other words, each of the non-requested and requested parts forms a non-contention/contention pair. According to an embodiment of the present invention, only these two non-contention/contention pairs, which are at the same time the requested and non-requested sections of the queue, are created for the queue. The various embodiments of the present invention are not limited, for example, to a placing of items into only a first and second section and can include other sub-placements.

Operations 600, 605, 610, 620, 630 and 640 are performed, for example, by a scheduler such as scheduler 105. However, the present invention is not limited to specific operations in FIG. 6 being performed by the scheduler.

Figure 7:
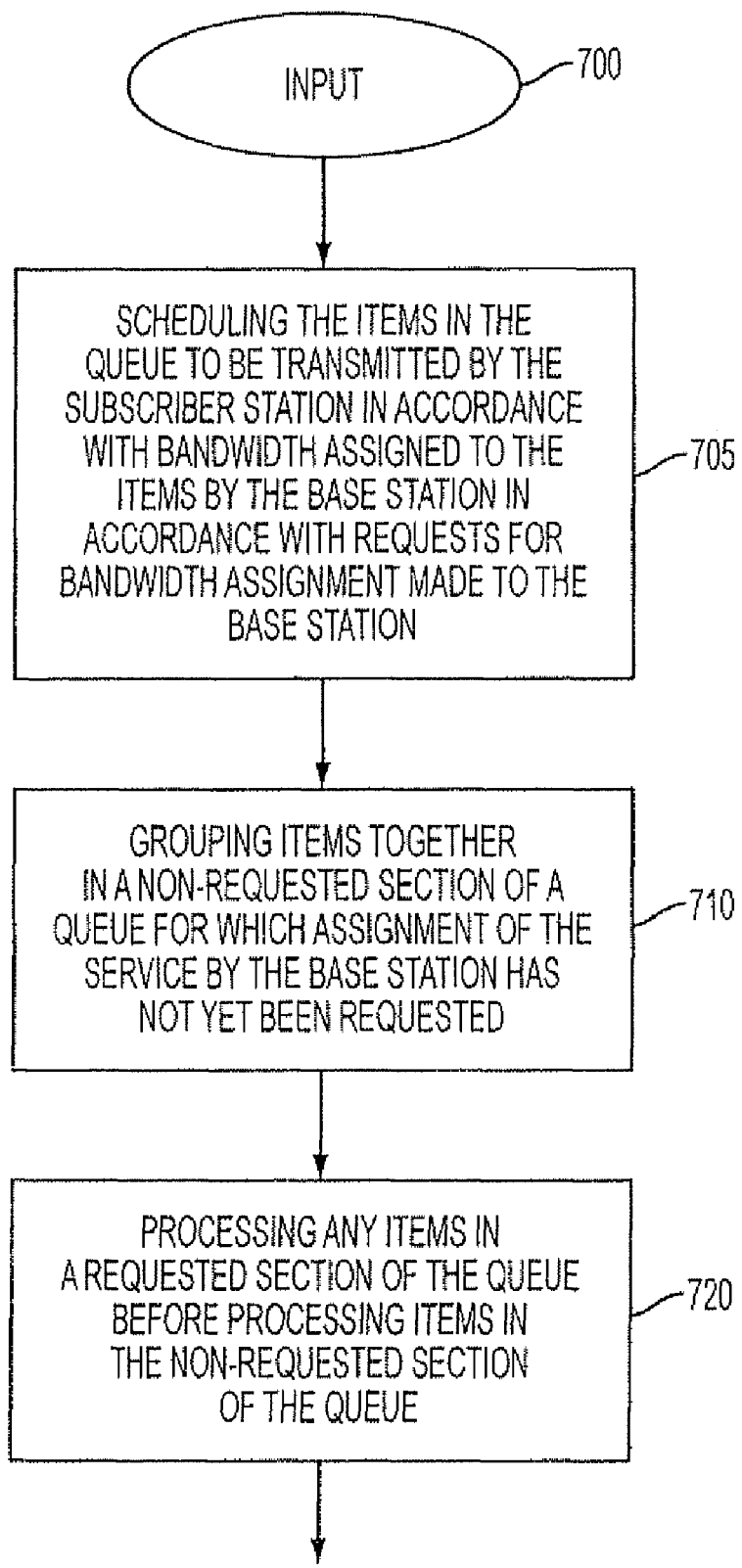
FIG. 7 is a flowchart illustrating a process which includes scheduling items in a queue to be transmitted by a subscriber station in accordance with bandwidth assigned to the items by a base station in accordance with requests for bandwidth assignment made to the base station, according to an embodiment of the present invention.

According to an embodiment of the present invention, a process includes grouping items together for which service (such as, for example, a bandwidth assignment) has not yet been requested. As illustrated in FIG. 7, the process includes operation 700, where items are inputted. In operation 705, items to be processed by a subscriber station in a wireless network are scheduled in accordance with a service assigned to the items by a base station in the network. From operation 705, the process moves to operation 710, where items are grouped together in a non-requested section of a queue for which assignment of the service by the base station has not yet been requested.

From operation 710, the process moves to operation 720, where any items in a requested section of the queue are processed before processing items in the non-requested section of the queue. According to an embodiment of the present invention, the service is an allocation of bandwidth for the items from the base station.

Operations 700, 705, 710 and 720 are performed, for example, by a scheduler such as scheduler 105. However, the present invention is not limited to specific operations in FIG. 7 being performed by the scheduler or the subscriber station.

The various embodiments of the present invention are not limited, for example, to a grouping of only the items into a non-requested section of a queue, and can include other groupings and with either the requested section of the queue, the non-requested section of the queue, or both the requested section of the queue and the non-requested section of the queue empty at any time.

Figure 8:
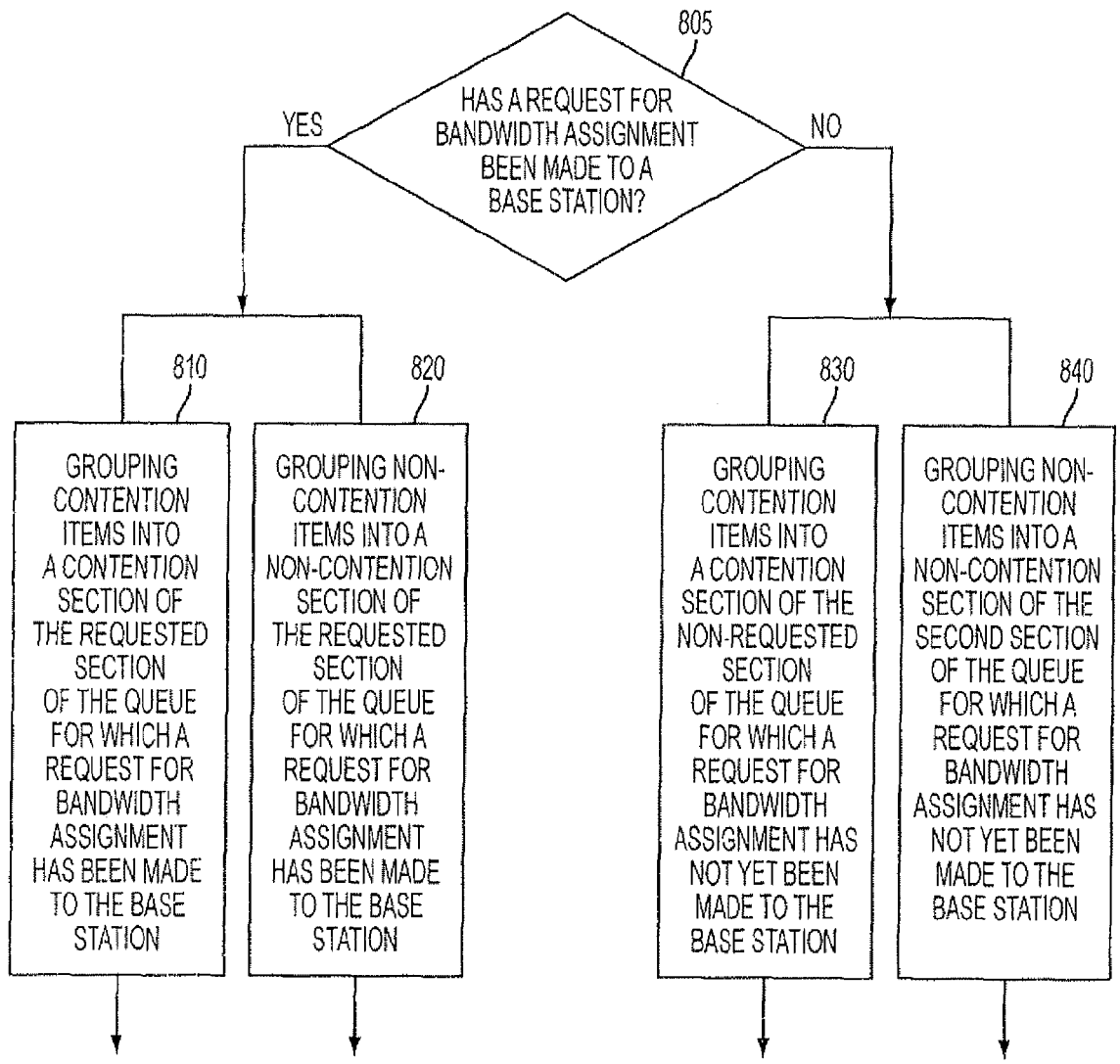
FIG. 8 is a flowchart illustrating a process which includes placing contention items into a contention section of the first section of the queue for which a request for bandwidth assignment has been made to the base station, according to an embodiment of the present invention.

According to an embodiment of the present invention, when the queue is a jitter queue or a latency queue, the contention items can be grouped together and non-contention items grouped together into different sections of a queue. For example, as illustrated in FIG. 8, a process includes operation 805, where it is determined whether a request for bandwidth has been made to a base station. Upon determining that a request for bandwidth to a base station has been made, the process moves to operation 810, where contention items are grouped into a contention section of the requested section of the queue for which a request for bandwidth assignment has been made to the base station and operation 820, where non-contention items are grouped into a non-contention section of the requested section of the queue for which a request for bandwidth assignment has been made to the base station.

Upon determining that a request for bandwidth to a base station has not yet been made, the process moves, instead, to operation 830, where contention items are grouped into a contention section of the non-requested section of the queue for which a request for bandwidth assignment has not yet been made to the base station, and operation 840, where non-contention items are grouped into a non-contention section of the second section of the queue for which a request for bandwidth assignment has not yet been made to the base station. The various embodiments of the present invention are not limited, for example, to a grouping into only one of two sections of the queue, and can include a grouping into a further subdivision of sections.

Operations 805, 810, 820, 830 and 840 are performed, for example, by a scheduler such as scheduler 105. However, the present invention is not limited to specific operations in FIG. 8 being performed by the scheduler.

Details of a subscriber station scheduler input queues associated with timed service flows, i.e., the jitter and latency queues are found in provisional application 60/865,454, filed Nov. 13, 2006, title "Division of Jitter and Latency Queues of a WIMAX Scheduler into Contention and Non-contention Parts," the contents of which are incorporated herein by reference.

According to embodiments of the present invention, processing of items for the purpose of issuing bandwidth requests is facilitated, since the scheduler can efficiently determine, from the division of requested and non-requested items, an amount of items requiring allocation. That is, keeping the non-requested items grouped together facilitates the processing of the items, e.g., for the purpose of issuing bandwidth requests for the items.

An advantage of the apparatus and process according to an embodiment of the present invention is an allowance of processing of the items in a regular queue order, even though a higher priority can be automatically given to the "requested" items.

Embodiments of the present invention relate to "bandwidth" being assigned. The concept of "bandwidth" is known. For example, in a wireless network based on the IEEE 802.16 standard, often referred to as a "WiMAX" network, a bandwidth is a space within a WiMAX frame in which items may be sent by the subscriber station.

Embodiments of the present invention are applicable to wireless networks based on the IEEE 802.16 standard. However, the present invention is not limited to such networks. Instead, the present invention is applicable to many other types of networks. Moreover, the present invention is not limited to mobile or fixed networks, or to mobile or fixed stations.

As indicated above, embodiments of the present invention are not limited to scheduling of items for transmission in accordance with a "bandwidth" assignment. Instead, in various embodiments of the present invention, items could be scheduled for transmission in accordance with assignment of another service, other than bandwidth, by the base station for the transmission. Therefore, various embodiments described herein as relating to bandwidth being assigned by the base station are also applicable to situations in which a different service, other than bandwidth, is assigned by the base station.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
a scheduler scheduling items to be transmitted by a subscriber station in a wireless network in accordance with bandwidth assigned to the items by a base station in the network; and
a queue into which the items to be transmitted by the subscriber station are placed, the queue having a first section into which items for which a request for bandwidth assignment has been made to the base station are placed, and a second section into which items for which a request for bandwidth assignment has not yet been made to the base station are placed,
wherein the scheduler schedules the items in the first section of the queue for transmission by the subscriber station before the items in the second section of the queue are scheduled for transmission, and
wherein items in the second section of the queue are dynamically moved to the first section of the queue as requests for bandwidth assignment for the items in the second section of the queue are made to the base station.

2. An apparatus as in claim 1, wherein either the first section of the queue, the second section of the queue, or both the first section of the queue and the second section of the queue may be empty at any time.

3. An apparatus as in claim 1, wherein the apparatus has a plurality of queues into which the items to be transmitted by the subscriber station are placed and items in a predetermined class of service flows are automatically placed in a same queue of the plurality of queues.

4. An apparatus comprising:
means for scheduling items to be transmitted by a subscriber station in a wireless network in accordance with bandwidth assigned to the items by a base station in the network; and
a queue into which items to be transmitted by the subscriber station are placed, the queue having a first section into which items for which a request for bandwidth assignment has been made to the base station are placed, and a second section into which items for which a request for bandwidth assignment has not yet been made to the base station are placed,
wherein the means for scheduling schedules the items in the first section of the queue for transmission by the subscriber station before the items in the second section of the queue are scheduled for transmission,
wherein items in the second section of the queue are dynamically moved to the first section of the queue as requests for bandwidth assignment for the items in the second section of the queue are made to the base station.

5. An apparatus as in claim 4, wherein the items to be transmitted by the subscriber station are user data packets or management messages.

6. An apparatus comprising:
a scheduler scheduling items to be transmitted by a subscriber station in a wireless network in accordance with an allocation of bandwidth from a base station; and
a queue into which items to be transmitted by the subscriber station are placed, the queue having a first section into which items for a request for the allocation of bandwidth has been made are placed, and a second section into which items for which the allocation of bandwidth has not yet been made are placed, wherein the first section is at the head of the queue,
wherein items in the second section of the queue are dynamically moved to the first section of the queue as requests for bandwidth assignment for the items in the second section of the queue are made to the base station.

7. An apparatus as in claim 6, wherein items for which the allocation is not required before being scheduled to be transmitted are placed in the first section of the queue.

8. An apparatus as in claim 6, wherein either the first section of the queue, the second section of the queue, or both the first section of the queue and the second section of the queue may be empty at any time.

9. A method comprising:
placing items into a first section of a queue of a scheduler of a subscriber station in a wireless network for which a request for bandwidth assignment has been made to a base station;
placing items into a second section of the queue for which a request for bandwidth assignment has not yet been made to the base station;
scheduling the items in the queue to be transmitted by the subscriber station in accordance with bandwidth assigned to the items by the base station in accordance with requests for bandwidth assignment made to the base station; and dynamically moving items in the second section of the queue to the first section of the queue as requests for bandwidth assignment for the items in the second section of the queue are made to the base station, wherein the items in the first section of the queue are scheduled to be transmitted by the subscriber station before the items in the second section of the queue are scheduled to be transmitted by the subscriber station.

10. A method as in claim 9, wherein items belonging to Unsolicited Grant Service (UGS) flows are placed immediately into the first section of the queue.

11. A method as in claim 9, wherein either the first section of the queue, the second section of the queue, or both the first section of the queue and the second section of the queue may be empty at any time.

12. A method comprising:
placing items into a first section of a queue of a scheduler of a subscriber station in a wireless network for which a request for bandwidth assignment has been made to a base station;
placing items into a second section of the queue for which a request for bandwidth assignment has not yet been made to the base station;
scheduling the items in the queue to be transmitted by the subscriber station in accordance with bandwidth assigned to the items by the base station in accordance with requests for bandwidth assignment made to the base station;
placing contention items into a contention section of the first section of the queue for which a request for bandwidth assignment has been made to the base station;
placing non-contention items into a non-contention section of the first section of the queue for which a request for bandwidth assignment has been made to the base station;
placing contention items into a contention section of the second section of the queue for which a request for bandwidth assignment has not yet been made to the base station; and
placing non-contention items into a non-contention section of the second section of the queue for which a request for bandwidth assignment has not yet been made to the base station,
wherein the items in the first section of the queue are scheduled to be transmitted by the subscriber station before the items in the second section of the queue are scheduled to be transmitted by the subscriber station, and
wherein the queue is a jitter queue or a latency queue.

13. A method comprising:
scheduling items to be processed by a subscriber station in a wireless network in accordance with a service assigned to the items by a base station in the network;
grouping items together in a non-requested section of a queue for which assignment of the service by the base station has not yet been requested;
processing any items in a requested section of the queue before processing items in the non-requested section of the queue; and
dynamically moving items in the second section of the queue to the first section of the queue as requests for bandwidth assignment for the items in the second section of the queue are made to the base station.

14. A method as in claim 13, wherein the service is an allocation of bandwidth for the items from the base station.

15. A method as in claim 13, wherein either the requested section of the queue, the non-requested section of the queue, or both the requested section of the queue and the non-requested section of the queue may be empty at any time.

16. A method comprising:
scheduling items to be processed by a subscriber station in a wireless network in accordance with a service assigned to the items by a base station in the network;
grouping items together in a non-requested section of a queue for which assignment of the service by the base station has not yet been requested;
processing any items in a requested section of the queue before processing items in the non-requested section of the queue; and
grouping contention items together and grouping non-contention items together,
wherein the queue is a jitter queue or a latency queue.

17. A method as in claim 16, wherein the grouping contention items together and the grouping non-contention items together further comprises:
grouping contention items into a contention section of the requested section of the queue for which a request for bandwidth assignment has been made to the base station,
grouping non-contention items into a non-contention section of the requested section of the queue for which a request for bandwidth assignment has been made to the base station,
grouping contention items into a contention section of the non-requested section of the queue for which a request for bandwidth assignment has not yet been made to the base station, and
grouping non-contention items into a non-contention section of the second section of the queue for which a request for bandwidth assignment has not yet been made to the base station.

* * * * *

UNITED STATES PATENT AND TRADEMARK OFFICE
CERTIFICATE OF CORRECTION

| | | |
|---|---|---|
| PATENT NO. | : 7,729,248 B2 | Page 1 of 1 |
| APPLICATION NO. | : 11/689081 | |
| DATED | : June 1, 2010 | |
| INVENTOR(S) | : Antoni Oleszczuk | |

It is certified that error appears in the above-identified patent and that said Letters Patent is hereby corrected as shown below:

Column 12, Line 49 delete "second" and insert --non-requested--.

Signed and Sealed this

Ninth Day of November, 2010

David J. Kappos
*Director of the United States Patent and Trademark Office*